(12) United States Patent
Bast (10) Patent No.: US 11,713,041 B2
(45) Date of Patent: Aug. 1, 2023

(54) CONTROL SYSTEM AND CONTROL METHOD FOR DRIVING A MOTOR VEHICLE

(71) Applicant: ZF Active Safety GmbH, Koblenz (DE)

(72) Inventor: Michael Bast, Bendorf (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 34 days.

(21) Appl. No.: 16/819,241

(22) Filed: Mar. 16, 2020

(65) Prior Publication Data

US 2020/0298853 A1 Sep. 24, 2020

(30) Foreign Application Priority Data

Mar. 22, 2019 (DE) ...................... 10 2019 107 412.6

(51) Int. Cl.
*B60W 30/16* (2020.01)
*B60W 10/18* (2012.01)
*B60W 40/12* (2012.01)

(52) U.S. Cl.
CPC .......... *B60W 30/162* (2013.01); *B60W 10/18* (2013.01); *B60W 40/12* (2013.01);
(Continued)

(58) Field of Classification Search
CPC ........... B60W 30/162; B60W 2754/30; B60W 2554/802; B60W 10/18
See application file for complete search history.

(56) References Cited

U.S. PATENT DOCUMENTS

2003/0028311 A1* 2/2003 Seto ...................... B60W 30/16
701/96
2005/0159875 A1 7/2005 Chia
(Continued)

FOREIGN PATENT DOCUMENTS

DE 102018003267 10/2019

*Primary Examiner* — Jelani A Smith
*Assistant Examiner* — Toya Pettiegrew
(74) *Attorney, Agent, or Firm* — Tarolli, Sundheim, Covell & Tummino L.L.P (57) ABSTRACT

A control system having an ACC control, which for use in a host motor vehicle (ego) is configured and intended for recognizing a preceding motor vehicle (alter) and preferably preceding objects, based on surroundings data obtained from at least one front camera sensor associated with the host motor vehicle (ego). The front camera sensor (FKS) is configured for providing to an electronic control unit of the control system the surroundings data that represent an area in front of the host motor vehicle (ego). The control system is at least configured and intended for detecting another motor vehicle (alter) in traffic that is in front of the host motor vehicle (ego), by means of the at least one front camera sensor (FKS), determining a distance between the host motor vehicle (ego) and the preceding motor vehicle (alter), based on data from the front camera sensor (FKS), determining a relevant difference in length ($\text{Diff}_{rel}$), based on the last determined distance ($A_{t-1}$) and the instantaneously determined distance ($A_t$), determining a distance ($A_{ACC}$) to be used by the ACC control, based on the relevant difference in length ($\text{Diff}_{rel}$) and the instantaneously determined distance ($A_t$), determining a measure of the criticality of the determined distance between the host motor vehicle (ego) and the preceding motor vehicle (alter), and outputting the distance ($A_{ACC}$) to be used to the ACC control of the host
(Continued)

vehicle (ego) when the measure of the criticality deviates significantly from a limit value.

10 Claims, 5 Drawing Sheets

(52) U.S. Cl.
CPC ... *B60W 2420/42* (2013.01); *B60W 2554/402* (2020.02); *B60W 2554/802* (2020.02); *B60W 2710/18* (2013.01); *B60W 2754/30* (2020.02)

(56) References Cited

U.S. PATENT DOCUMENTS

| | | | |
|---|---|---|---|
| 2007/0142996 A1* | 6/2007 | Lee | B60W 30/16 |
| | | | 701/96 |
| 2015/0151755 A1* | 6/2015 | Ohmori | B60T 8/17558 |
| | | | 701/93 |
| 2015/0291160 A1* | 10/2015 | Kim | B60W 30/16 |
| | | | 345/633 |
| 2016/0009282 A1* | 1/2016 | Tokimasa | B60W 10/18 |
| | | | 701/96 |
| 2017/0066443 A1* | 3/2017 | Kobayashi | B60W 30/16 |
| 2018/0178714 A1* | 6/2018 | Fujii | B60W 30/16 |
| 2019/0071074 A1* | 3/2019 | Gokan | G06K 9/00805 |
| 2020/0094831 A1* | 3/2020 | Kudo | B60W 50/0097 |
| 2020/0223450 A1* | 7/2020 | Iwamoto | B60W 60/00 |

\* cited by examiner

CONTROL SYSTEM AND CONTROL METHOD FOR DRIVING A MOTOR VEHICLE

RELATED APPLICATION

This application claims priority from German Application No. 10 2019 107 412.6 filed Mar. 22, 2019, the subject matter of which is incorporated herein by reference in its entirety.

BACKGROUND OF THE INVENTION

A control system and a control method for driving a motor vehicle are disclosed herein for avoiding a collision with a preceding or following motor vehicle. This control system and the control method are based in particular on a surroundings sensor system in the host motor vehicle, and assist the driver thereof or an autonomously traveling motor vehicle. For semiautonomous motor vehicles and autonomously controlled motor vehicles, the aim is to increase the safety of the occupants of the motor vehicle. Details in this regard are defined in the claims; in addition, the description and the drawings contain relevant information concerning the system and the operating principle, as well as variants of the system and of the method.

Prior Art

Present driver assistance systems (advanced driver assistance systems (ADAS)) provide numerous monitoring and information functions in motor vehicles in order to make driving a motor vehicle safer. The surroundings of the motor vehicle are hereby monitored with regard to the travel course of the host motor vehicle, based on surroundings data obtained from one or more surroundings sensors situated on the motor vehicle.

Known driver assistance systems are equipped with a mono camera sensor, and determine, for example, whether the motor vehicle is within a lane and whether the driver is unintentionally drifting to one side of the lane or is about to leave the lane. Based on the obtained surroundings data, these driver assistance systems generate an at least partial "map" of the road, and in particular of the lane. In the process, objects such as a preceding (motor) vehicle, a curb, lane boundary lines, directional arrows, etc., are recognized and tracked during travel. In motor vehicles driven by persons, the driver assistance systems usually provide an information function in order to warn the driver of a critical situation or a corresponding maneuver, or to recommend to the driver a suitable maneuver for the host motor vehicle. The driver assistance systems may likewise be used in autonomously controlled motor vehicles in order to provide the autonomous control system with the appropriate surroundings data.

In addition, the speed of the host (following) motor vehicle is adapted to the speed of a preceding motor vehicle in so-called adaptive cruise control (ACC) systems via automatic speed control. The aim is to always maintain a certain distance from the preceding motor vehicle. For this purpose, such systems determine a movement direction and/or a speed of the preceding motor vehicle in order to prevent the motor vehicle from crossing the path of the preceding motor vehicle in such a way that a critical situation results. This involves on the one hand lane changes or turning operations, and on the other hand the avoidance of rear-end collisions.

The ACC system in the motor vehicle (also referred to below as the host motor vehicle), also in the approach presented here, uses sensors to measure the position, distance, and speed of the preceding motor vehicle. The speed of the host motor vehicle is then appropriately adapted via engine and/or braking intervention.

Systems having radar sensors, lidar sensors, and (mono or multi) camera sensors are used in ACC systems. The driver can easily set the desired temporal or spatial distance from the preceding motor vehicle. The ACC control is interrupted by actuating the accelerator pedal, and is deactivated by actuating the brake pedal. The simple ACC system is equipped with an optical and acoustic warning system for the driver. More advanced systems provide emergency braking if necessary.

Some ACC systems contain a "follow-to-stop" (FTS) function, via which the host motor vehicle follows the preceding motor vehicle until the latter comes to a stop, and afterward does not automatically restart.

Underlying Problem

In particular camera-based ACC systems are become increasingly common due to the fact that they are able to provide better results for cyclist and pedestrian recognition compared to radar-based ACC systems. A mono camera is situated in the center of the windshield of the host motor vehicle. However, different outward appearances of preceding vehicles, for example trucks with flat-bed trailers, passenger vehicles with trailers, or the like may result in erroneous assessments of the speed or the distance of the host motor vehicle with respect to the preceding motor vehicle, since the image evaluation, as a relevant distance reference, jumps back and forth between the preceding motor vehicle and its trailer. These recognition errors in particular occur at close range (approximately 5 m-20 m) in such ACC systems that use a mono camera as a sensor.

These recognition errors result in physically/technically impossible jumps in the distance signal. At close range, the distance of the host motor vehicle from the preceding motor vehicle is the main control variable for ACC distance control to a standstill (ACC-FTS). The control is not sufficiently reliable when the distance error is too large. When the indicated distance is greater than the actual distance, without intervention by the driver the host motor vehicle would collide with the rear end of the preceding motor vehicle (ACC target vehicle). In addition to a collision of the host motor vehicle with the preceding motor vehicle, this may also result in a rear-end collision with a vehicle that is following the host motor vehicle.

The object, therefore, is to provide a control system and a control method for a motor vehicle for driving the motor vehicle in a safe manner.

Proposed Solution

This object is achieved by a control system having the features of independent Claim 1, and a control method having the features of independent Claim 10. Preferred embodiments will become apparent from subclaims 2 through 9.

One aspect relates to a control system having ACC control, which for use in a host motor vehicle is configured and intended for recognizing a preceding motor vehicle and preferably preceding objects, based on surroundings data obtained from at least one front camera sensor associated with the host motor vehicle, wherein the at least one front camera sensor is configured for providing to an electronic control unit of the control system the surroundings data that represent an area in front of the host motor vehicle, and wherein the control system is at least configured and intended for detecting another motor vehicle in traffic that is in front of the host motor vehicle, by means of the at least one front camera sensor; determining a distance between the host motor vehicle and the preceding motor vehicle, based on data from the front camera sensor; determining a relevant difference in length, based on the last determined distance and the instantaneously determined distance; determining a distance to be used by the ACC control, based on the relevant difference in length and the instantaneously determined distance; determining a measure of the criticality of the determined distance between the host motor vehicle (ego) and the preceding motor vehicle (alter); and outputting the distance to be used to the ACC control of the host vehicle when the measure of the criticality deviates significantly from a limit value.

The control system may be configured and intended for outputting to the ACC control the distance to be used, in the form of a recommendation for the driver of the host motor vehicle or (semi)autonomously, as a function of the distance to be used, in order to influence a distance from the preceding motor vehicle via a braking system or an engine management system of the host motor vehicle. Alternatively or additionally, it is also conceivable for the control system, for example via the ACC control, to output a warning to the driver of the host motor vehicle in order to indicate that a current driving situation of the host motor vehicle is no longer, or potentially is no longer, controllable by the ACC control. The warning may include various warning stages in which the control system may output to the driver of the host motor vehicle different optical, acoustic, and/or haptic warnings, for example via a suitable display and/or via suitable speakers and/or via vibrations of the steering wheel and/or the brake pedal and/or accelerator pedal, at different intensity levels.

In addition, the control system may be configured and intended for determining a relevant difference in length, based on the last determined distance and the instantaneously determined distance, by determining a difference based on the last determined distance and the instantaneously determined distance; and/or determining whether this difference is positive or negative; comparing this difference to a threshold that has a presettable minimum and a presettable slope and that is a function of the instantaneously determined distance; and categorizing this difference as the relevant difference in length if this difference is above the threshold.

The control system may likewise be configured and intended for storing the relevant difference in length, the instantaneously determined distance, and/or the distance ($A_{ACC}$) to be used by the ACC control for a future evaluation.

According to certain embodiments, the control system is configured and intended for determining the distance to be used by the ACC control, based on the relevant difference in length and the instantaneously determined distance, by examining a sequence of the next-to-last determined distance, the last determined distance, and the instantaneously determined distance, by using a first distance based on the next-to-last determined distance and the last determined distance, and a second distance based on the last determined distance and the instantaneously determined distance, and for determining the distance to be used by the ACC control, reducing the instantaneously determined distance by the relevant difference in length if the first distance is greater than the second distance, or leaving the instantaneously determined distance unchanged if the first distance is less than or equal to the second distance.

For determining the measure of the criticality of the determined distance between the host motor vehicle and the preceding motor vehicle, the control system may be configured and intended for determining a longitudinal distance between the host motor vehicle and the preceding motor vehicle, determining a time gap between the host motor vehicle and the preceding motor vehicle, based on the longitudinal distance between the host motor vehicle and the preceding motor vehicle, generating a criticality number that denotes the measure of the criticality, based on the longitudinal distance, the time gap, and/or an acceleration request by the ACC control, and in the case that the measure of criticality does not deviate from the limit value, deactivating the ACC control, at least in part.

Accordingly, the control system compares the criticality number to the limit value to determine whether the distance to be used is to be output to the ACC control of the host vehicle. If the criticality number is the same as the limit value or deviates only insignificantly therefrom, the distance to be used is not output to the ACC control. Instead, in such a case the ACC control may be deactivated in the sense that, although braking interventions for the host motor vehicle are still possible, acceleration requests by the ACC control are not possible, at least temporarily.

The control system may be configured and intended for normalizing the longitudinal distance, the time gap, and/or the acceleration request, computing the criticality number by adding the normalized longitudinal distance, the normalized time gap, and/or the normalized acceleration request, and/or reactivating the ACC control when a predetermined condition is satisfied.

Optionally, the control system may also be configured for linking the criticality number to an error event for the preceding motor vehicle that is recognized by the control system. The control system may create and store an error history based on multiple error events that are linked to the preceding motor vehicle. The control system may be configured and intended for obtaining one or more summands from this error history and including them in the computation for generating the criticality number.

The error event may be a physically/technically impossible jump, recognized by the control system, in the distance signal between the next-to-last determined distance and the last determined distance, and/or between the last determined distance and the instantaneously determined distance. The predetermined condition may be, for example, a minimum distance and/or a minimum speed difference between the host motor vehicle and the preceding motor vehicle. The predetermined condition may be linked to the preceding motor vehicle via a vehicle recognition of same.

In addition to the longitudinal distance, the time gap, and/or the acceleration request, it is optionally possible to use even further input variables for determining the measure of the criticality. These include categorizing the preceding motor vehicle in an object class, for example in one of the object classes "truck," "passenger vehicle," or "motorcycle," optionally with a trailer in each case, as well as a yaw rate of the host motor vehicle and/or of the preceding motor vehicle, and a possible time to collision (TTC) of the host motor vehicle with the preceding motor vehicle. Each of these optional input variables may be incorporated, individually or in combination with one more of the other optional input variables, into the evaluation of the criticality.

The optional variables in question are then normalized in a similar manner and added to the criticality number.

According to certain embodiments, the control system may be configured and intended for classifying the other motor vehicle in an object class, based on the data of the front camera sensor, and if the other motor vehicle is classified in an object class that is different from the passenger vehicle object class, reducing the next-to-last determined distance ($A_{t-2}$) and/or the last determined distance ($A_{t-1}$) and/or the instantaneously determined distance ($A_t$) by a predetermined distance.

The control system may classify objects detected by the front camera sensor, for example, in one of the object classes "truck," "passenger vehicle," or "motorcycle." A further subdivision of the individual classes, for example into "truck with trailer" and "truck without trailer," is also conceivable (the same correspondingly applies for the passenger vehicle and motorcycle classes).

The predetermined distance for reducing the instantaneously determined distance may be one meter, for example. In particular when the preceding motor vehicle is a large vehicle such as a van or a truck, the subjective sense of security of the driver of the host motor vehicle may be increased in this way, which in turn contributes to an increase in the objective driving safety. By incorporating the predetermined distance (also referred to as the offset amount within the scope of the present disclosure), even more secure and comfortable longitudinal control of the speed is achieved by the ACC control of the host motor vehicle.

Alternatively or additionally, the control system may be configured and intended for increasing a rest distance, which is to be achieved within the scope of follow-to-stop travel after the host motor vehicle and the other motor vehicle decelerate to a standstill, by a certain distance, for example one meter. The increase in the rest distance may maintain its validity in conjunction with a time gap with respect to the preceding motor vehicle of 1.5 seconds, for example, which is settable by the driver of the host motor vehicle. The increase may also maintain its validity for other settings with regard to the time gap, or may assume a value smaller or larger than 1 meter.

The increase in the rest distance between the motor vehicles does not influence the dynamics of the driving situation and their critical computations by the control system, but, even if no additional object classification is present, results in even more reliable and safe stopping of the host motor vehicle with the desired rest distance from the preceding motor vehicle.

According to certain embodiments, the control system may also be configured and intended for classifying the other motor vehicle in an object class, based on the data of the front camera sensor, and if the other motor vehicle is classified in an object class that is different from the truck object class, upon output of the distance ($A_{ACC}$) to be used, starting a timer with a predetermined time period, recognizing an expiration of the timer after the predetermined time period has elapsed, and upon recognition of the expiration of the timer, outputting to the ACC control of the host vehicle the instantaneously determined distance $A_T$ as the distance to be used by the ACC control.

Thus, in particular the fact may be taken into account that for passenger vehicles, jumps in the distance signal result primarily from short-term interferences, for example a rotation about the longitudinal axis and/or about the vertical axis of the host motor vehicle, a change in the ambient light around the host motor vehicle such as a change in light/shadow, and other objects in the detection range of the FKS sensor. In this way, in particular for follow-to-stop travel of the host motor vehicle behind the other motor vehicle, the distance between the two motor vehicles may be kept preferably small without an increased risk of a collision.

A further aspect relates to a control method, which in a host motor vehicle (ego) recognizes a preceding motor vehicle (alter) and preferably preceding objects, based on surroundings data that represent an area in front of the host motor vehicle (ego) and are obtained from at least one front camera sensor (FKS) associated with the host motor vehicle (ego). The control method may be carried out in particular using the control system described above, and comprises at least the steps:

detecting another motor vehicle (alter) in traffic in front of the host motor vehicle (ego) by means of the at least one front camera sensor (FKS);

determining a distance between the host motor vehicle (ego) and the preceding motor vehicle (alter), based on data from the front camera sensor (FKS);

determining a relevant difference in length ($Diff_{rel}$), based on the last determined distance ($A_{t-1}$) and the instantaneously determined distance ($A_t$);

determining a distance ($A_{ACC}$) to be used by the ACC control, based on the relevant difference in length ($Diff_{rel}$) and the instantaneously determined distance ($A_t$);

determining a measure of the criticality of the determined distance between the host motor vehicle (ego) and the preceding motor vehicle (alter); and outputting the distance ($A_{ACC}$) to be used to the ACC control of the host motor vehicle (ego) when the measure of the criticality deviates significantly from a limit value.

In the procedure presented here, the jumps or differences in length in the distance of the host motor vehicle from the preceding motor vehicle are recognized and processed in multiple steps: 1) recognizing relevant jumps/relevant differences in length of the distances of the host motor vehicle from the preceding motor vehicle, 2) storing physical information and status information for a selected preceding motor vehicle and computing a corrected distance, 3) determining the criticality in the particular situation in which the jump is recognized, and 4) taking suitable measures. Improved availability and increased safety during following travel to a standstill behind a target vehicle, in particular for mono camera-based ACC systems, is thus achievable. The option for merely partially deactivating the ACC control and reactivating it results in an even further increase in the availability, and an improvement in the overall understanding of the system behavior.

Implausible changes, i.e., jumps or differences in length of the distance between the host motor vehicle and the preceding motor vehicle, occur more frequently than jumps that also result in a critical situation for the host motor vehicle. For this reason, within the scope of the present disclosure the control system incorporates the measure of the criticality between the host motor vehicle and the preceding motor vehicle in order not to burden the driver of the host motor vehicle with an unnecessarily large number of warnings and/or at least partial deactivation of the ACC control, i.e., to avoid false alarms and/or so as not to unnecessarily limit the availability of the ACC control.

While previous vehicle functions that intervene in the longitudinal dynamics of the vehicle, also automatic emergency braking (AEB) systems, are based essentially on sensor-based detection of the front area of the host motor vehicle by radar or lidar and the host motor vehicle driving behavior (current speed and current acceleration/deceleration), instead of the above-mentioned data sources the approach presented here uses detection of the front area of the host motor vehicle by a camera sensor, and after plausibility checking, possible correction, and a reliability assessment (criticality consideration), intervenes in the control of the longitudinal dynamics of the host motor vehicle and at least partially switches off the ACC control in a controlled manner and/or additionally assists the driver of the host motor vehicle with a warning. This results in improved safety in various aspects. The detection of the front area of the host motor vehicle by camera sensor may be based, for example, on a camera situated in the top central area of the windshield or in the front end of the host motor vehicle.

With knowledge of the driving process in the front area of the host motor vehicle, it is possible, for example, to appropriately adapt the behavior of the host motor vehicle to the situation during emergency braking. For example, if a truck (or some other vehicle) with a trailer is traveling in front of the host motor vehicle, the mono camera with its downstream image evaluation unit may provide the ACC system with more information, based on recognition errors, at shorter distances between the host motor vehicle and the target vehicle. These recognition errors are manifested by a jumping distance signal. In the absence of intervention by the driver, such errors may result in a rear-end collision with the target vehicle. The approach presented here is able to recognize these errors, and to act on the longitudinal control of the host motor vehicle in terms of increased safety. This also reduces the risk of a rear-end collision with a following vehicle.

In current systems for controlling the longitudinal dynamics, failure to use the information in the manner described above results in a later braking operation that is carried out with greater deceleration, and generally poorer availability of the ACC control during travel. This also increases the likelihood of a collision with a following vehicle whose driver is inattentive. In addition, such a rear-end collision is more serious than one that follows lighter, earlier braking.

In one variant, the control system presented here is configured and intended for introducing the activation of the deceleration of the host vehicle in the form of a recommendation for the driver of the host motor vehicle. This recommendation may take place by acoustic, optical, or haptic means. Thus, for example, a haptic recommendation may be provided to the driver by an accelerator pedal and/or brake pedal that are/is set in vibration, wherein for example the resilience of the brake pedal or the vibration frequency noticeably increases for the driver when the recommended deceleration is achieved. For a (semi)autonomous motor vehicle, the recommendation, possibly independently of a braking intervention by the driver, is initiated as a default via a braking system or the engine management system of the host motor vehicle.

It is apparent that the aspects and features described above may be arbitrarily combined in a control system and/or a control method. Although some of the above-described features have been described with regard to a control system, it is understood that these features are also applicable to a control method. Similarly, the features described above with regard to a control method are correspondingly applicable to a control system.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein. The dimensions and proportions of the components shown in the figures are not to scale.

DETAILED DESCRIPTION OF THE DRAWINGS

Figure 1:
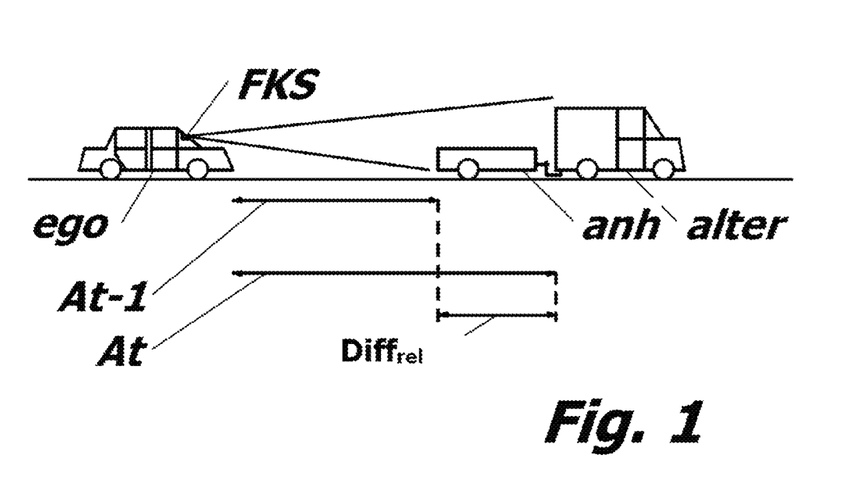
FIG. 1 schematically shows a host motor vehicle in which at least one other vehicle with a trailer is detected in an area in front of the host motor vehicle by means of a mono front camera with a downstream image evaluation unit and ACC system.

FIG. 1 schematically shows a host motor vehicle ego that is traveling behind another motor vehicle in traffic in the travel direction. The other motor vehicle alter is depicted here as a van that is pulling a trailer anh. However, the present disclosure is not limited thereto. Alternatively, the other motor vehicle may also be passenger vehicle, or a truck or some other motor vehicle, with or without a trailer.

The host motor vehicle ego has a mono front camera sensor FKS situated in the top central area of the windshield or in the front end of the host motor vehicle.

The host motor vehicle ego has a control system with an ACC control. This ACC control receives distance data, as input data, concerning the other motor vehicle alter traveling in front of the host motor vehicle ego. The front camera sensor FKS delivers surroundings data of the preceding motor vehicle alter. The front camera sensor FKS is configured for providing the electronic control unit of the control system with surroundings data that represent an area in front of the host motor vehicle ego. The control system may determine a distance between the host motor vehicle ego and the preceding motor vehicle alter, based on the surroundings (image) data of the mono front camera sensor FKS, by means of software image processing. When the detection range of the mono front camera sensor FKS changes, for example due to the host motor vehicle ego approaching the preceding motor vehicle, the distance signal delivered by the image processing software may jump from the other motor vehicle alter to the trailer anh or in the other direction (also possibly back and forth). This may result in unsafe driving situations, since the host motor vehicle ego may have a rear-end collision with the preceding motor vehicle alter, or more precisely, with its trailer anh, due to the fact that the ACC control is operated with incorrect data (data for an excessively large distance).

Figure 3:
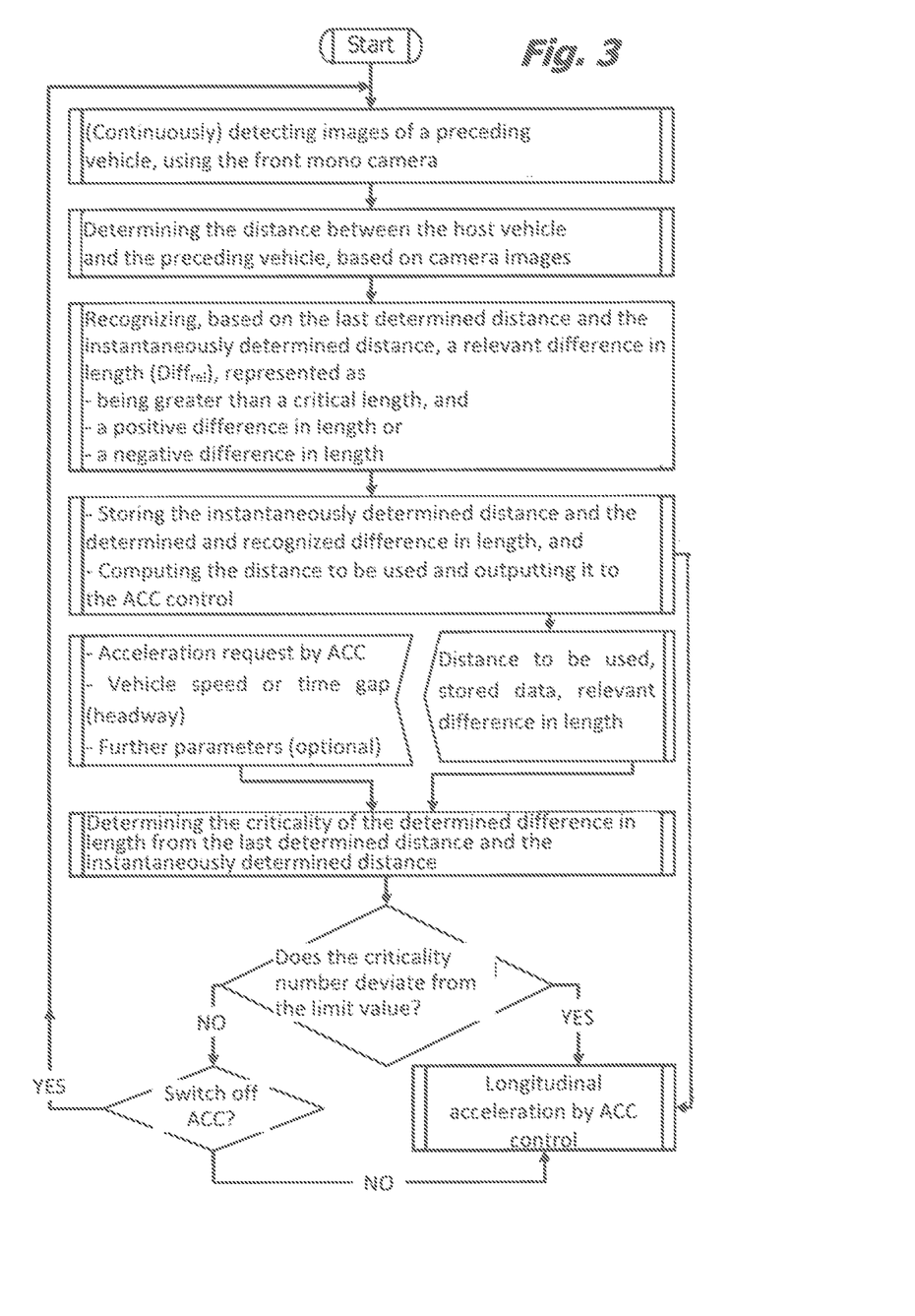
FIG. 3 shows a flow chart of an evaluation of images from the mono front camera in order to influence an ACC control system.

To avoid this, the control described here according to the flow chart in FIG. 3 is used to determine a distance $A_{ACC}$ to be used, based on the image data, and to output it in the form of a recommendation for the driver of the host motor vehicle ego or (semi)autonomously to a driving entity for the ACC control. A distance from the preceding motor vehicle alter may thus be influenced via a braking system of the host motor vehicle ego or its engine management system. The image processing unit determines a distance $A_t$ between the host motor vehicle ego and the preceding motor vehicle alter, based on the data of the front camera sensor FKS. A relevant difference in length $\text{Diff}_{rel}$ is subsequently determined based on the last determined distance $A_{t-1}$ (determined and stored in the preceding measuring cycle) and the instantaneously determined distance $A_t$. The determined relevant difference in length $\text{Diff}_{rel}$ and the instantaneously determined distance $A_t$ are used to determine a distance $A_{ACC}$ to be used by the ACC control. The distance $A_{ACC}$ to be used, determined in this way, is output to the ACC control of the host vehicle ego.

Figure 4:
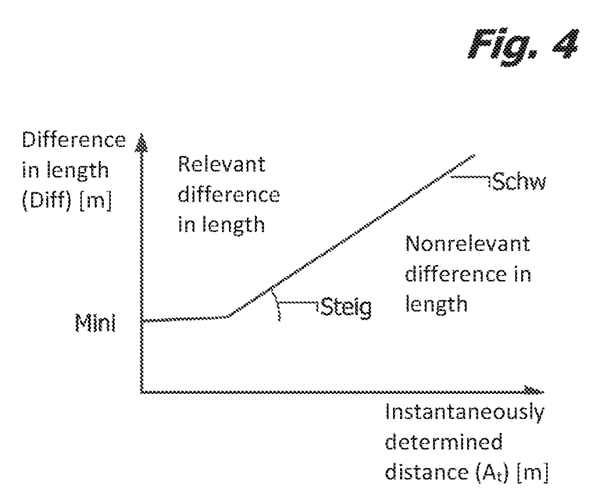
FIG. 4 shows a diagram explaining how a nonrelevant difference in length is to be distinguished from a relevant difference in length.

The relevant difference in length $\text{Diff}_{rel}$ is determined from the last determined distance $A_{t-1}$ and the instantaneously determined distance $A_t$ by determining a difference Diff based on the last determined distance $A_{t-1}$ and the instantaneously determined distance $A_t$. In addition, it is determined whether this difference Diff is positive or negative. Furthermore, this difference Diff is compared to a threshold Schw, which is a function of the instantaneously determined distance $A_t$ (see FIG. 4) and has a presettable minimum Mini and a presettable slope Steig. Lastly, this difference Diff is categorized as the relevant difference in length $\text{Diff}_{rel}$ if this difference Diff is above the threshold Schw.

The following data, among others, are stored in the control system for subsequent measuring cycles or for a future evaluation: the relevant difference in length $\text{Diff}_{rel}$, the instantaneously determined distance $A_t$, and the distance $A_{ACC}$ to be used by the ACC control. It is understood that the instantaneously determined distance $A_t$ is used as $A_{t-1}$ in the next evaluation, and as $A_{t-2}$ in the evaluation that follows it.

The control system may thus determine the distance $A_{ACC}$ to be used by the ACC control, based on the relevant difference in length $\text{Diff}_{rel}$ and the instantaneously determined distance $A_t$, by examining a sequence of the next-to-last determined distance $A_{t-2}$, the last determined distance $A_{t-1}$, and the instantaneously determined distance $A_t$. A first distance $A_t$ based on the next-to-last determined distance $A_{t-2}$ and the last determined distance $A_{t-1}$, and a second distance $A_2$ based on the last determined distance $A_{t-1}$ and the instantaneously determined distance $A_t$, are determined. To determine the distance $A_{ACC}$ to be used by the ACC control, the instantaneously determined distance $A_t$ is reduced by the relevant difference in length $\text{Diff}_{rel}$ if the first distance $A_1$ is greater than the second distance $A_2$. The instantaneously determined distance $A_t$ remains unchanged if the first distance $A_1$ is less than or equal to the second distance $A_2$.

Distance signals even farther in the past may optionally be considered in determining the distance to be used by the ACC control. Thus, for example, in addition to the next-to-last determined distance, the last determined distance, and the instantaneously determined distance, two distance values $A_{t-3}$ and $A_{t-4}$ (not shown in the figures) that were determined chronologically before the next-to-last determined distance signal may be incorporated into the determination. The distance to be used is then determined as described above, except that two additional distances $A_3$ (between the distance signals $A_{t-3}$ and $A_{t-4}$ chronologically before the next-to-last distance signal) and $A_4$ (between the chronologically next before the next-to-last distance signal and the next-to-last distance signal, i.e., between $A_{t-3}$ and $A_{t-2}$) are computed and used for determining the distance to be used by the ACC control.

Based on the relevant difference in length $\text{Diff}_{rel}$, the instantaneously determined distance $A_t$, the distance $A_{ACC}$ to be used by the ACC control, and/or other input variables, a measure of the criticality may be determined which is characteristic for the reliability of the current measurement of the distance between the host motor vehicle and the other motor vehicle. If this measure of the criticality does not, or does not significantly, deviate from a limit value (see FIG. 3), the control, optionally with consideration of other conditions, prompts deactivation of the ACC control and/or output of an alarm to the driver of the host motor vehicle. Deactivation of the ACC control is understood to mean, among other things, a state in which the ACC control can still make braking requests, and in addition an alarm is output to the driver of the host motor vehicle that a critical situation is imminent. Acceleration requests are not possible in the deactivated state of the ACC control. If the limit value is significantly undershot or overshot, the ACC control remains active for the longitudinal acceleration (see FIG. 3), optionally also without outputting a warning to the driver of the host motor vehicle.

Figure 5:
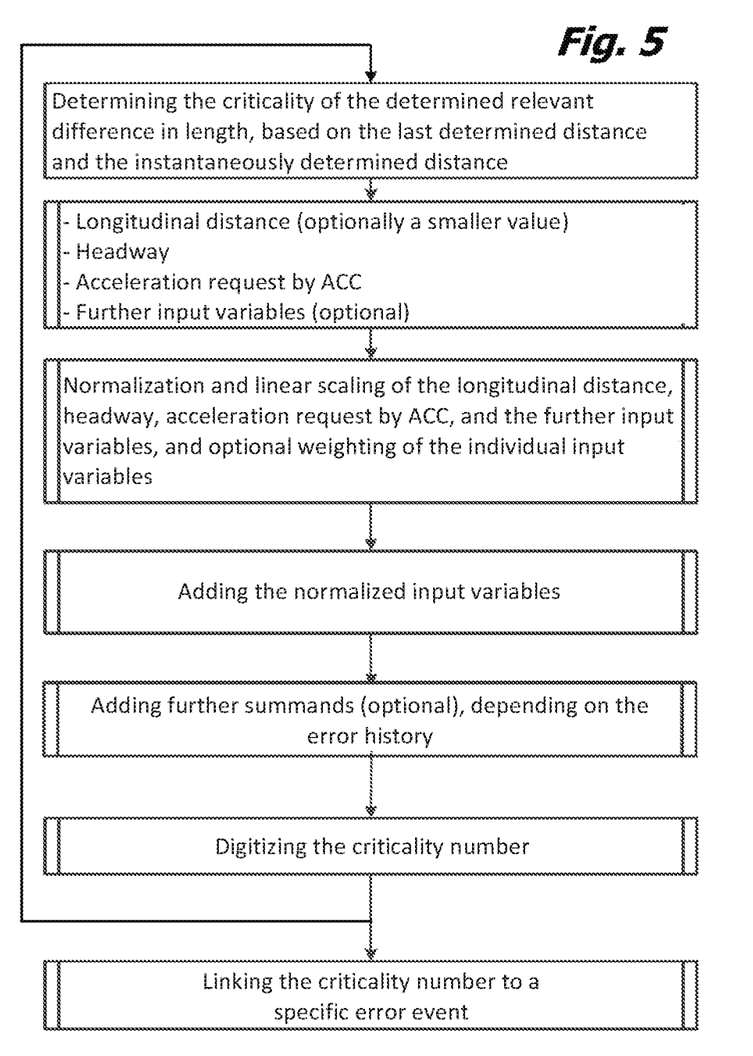
FIG. 5 shows a diagram for determining the criticality of the determined difference in length between a host motor vehicle and another motor vehicle.

The determination of the measure of the criticality (also referred to below as the criticality number) and its meaning for the distance control for the host motor vehicle are described with reference to FIG. 5. FIG. 5 shows the individual steps that are carried out by the control system in the step "Determining the criticality of the determined difference in length from the last determined distance and the instantaneously determined distance" according to FIG. 3. The ACC control may be deactivated in particular when the criticality number overshoots or undershoots the limit value, i.e., significantly deviates from the limit value. Significant deviations are understood to mean only deviations that are not caused by measurement uncertainties and/or by sensor noise, which result in very small deviations from the limit value.

The control system uses suitable state variables as input variables for determining the criticality, in order to assess whether an action such as switching off the ACC control and/or warning the driver of the host motor vehicle are/is even necessary at all in order to minimize the frequency of undesirable warnings and/or unavailability of the ACC control. The input variables involve a longitudinal distance between the host motor vehicle and the other motor vehicle, the time gap (headway) between the host motor vehicle and the other motor vehicle, and an acceleration requested by the ACC control of the host motor vehicle.

The control system of the host motor vehicle is configured and intended for recognizing jumps, i.e., impossible or at least implausible changes from a technical and/or physical standpoint, between the respective individual distance signals $A_t$, $A_{t-1}$, $A_{t-2}$, $A_{t-3}$, and $A_{t-4}$ and classifying them as such. For this purpose, the control system determines whether individual changes in the distance between the particular chronologically successive distance signals are physically possible, taking into account the current driving conditions such as speed and acceleration of the host motor vehicle and the preceding motor vehicle, and taking into account the system requirements of the host motor vehicle such as the maximal possible acceleration.

In particular when the control system has recognized a jump, in a current assessment situation for example the distance signal comprising the two most current distance signals $A_t$, $A_{t-1}$ (or optionally, also comprising the three or four or five most current distance signals), which denotes the smallest distance between the host motor vehicle and the other motor vehicle, may be used as the longitudinal distance.

The time gap between the host motor vehicle and the preceding motor vehicle denotes the time, for example in seconds, resulting from the current distance $A_t$ between the host motor vehicle and the preceding motor vehicle, divided by the vehicle speed of the host motor vehicle (in the longitudinal direction) at the time that $A_t$ is determined. The latter may be determined, for example, based on a vehicle-internal sensor system (such as wheel speed sensors) and provided to the control system.

In addition to the time gap, the longitudinal distance, and the acceleration requested by the ACC control, further variables may optionally be taken into account as input variables for assessing the criticality. Thus, an object classification of the preceding motor vehicle and/or a yaw rate of the host motor vehicle and/or a time (time to collision (TTC)) may also be taken into account in assessing the criticality, subsequent to which a collision of the host motor vehicle with the other motor vehicle could potentially occur, for example without braking intervention by the control system or the driver.

The more of these optional parameters that are taken into account in determining the criticality, the more precisely this assessment may be carried out. Thus, for example, the control system is able to recognize different patterns in the error profile, regarding object classes such as passenger vehicles and trucks, by suitable image evaluation of the data of the front camera sensor and to use this information in assessing the measure of criticality. In addition, within the scope of the object classification, the recognition of a passenger vehicle or truck with a trailer may result in a higher measure of criticality compared to a passenger vehicle or truck that is not pulling a trailer.

The incorporation of the yaw rate of the host motor vehicle is used to compensate for undesirable movements in the images (i.e., the data) of the front camera sensor that are caused by rotation of the front camera sensor FKS of the host motor vehicle during the image capture, and that may result in inaccuracies in the assessment of criticality.

The TTC is determined by the control system, based on the distance between the host motor vehicle and the other motor vehicle divided by the speed difference between the two motor vehicles. The relative speed between the host motor vehicle and the other motor vehicle is thus incorporated into the assessment of criticality. This contributes to even better consideration of the dynamics of the current driving situation.

The aim in determining the criticality is to generate a criticality number from the mentioned input variables, which is then compared to a limit value. All input variables are normalized in order to establish comparability and to obtain a dimensionless criticality number. The normalization takes place in a range of −1 to 1, for example, where −1 denotes the highest measure of criticality. In contrast, a normalized number of 1 represents the lowest criticality. It is understood that the algebraic signs are defined here strictly by way of example. Similarly, the algebraic signs may be defined in such a way that a positive value of 1 denotes the highest measure of criticality, while the negative value of −1 represents the lowest measure of criticality.

Within the scope of the normalization, for example an acceleration range for the acceleration by the ACC control between −5 m/s² and 1 m/s² is linearly mapped, i.e., scaled, onto the range −1 to 1. For determining the criticality, one or more of the input variables may be weighted in the scaling. It is thus possible to provide certain input variables, for example the longitudinal distance, the time gap, and/or the acceleration request by the ACC control, and/or one or more of the optional input variables, with weighting factors, for example by multiplication, in order to assign greater or lesser importance to certain input variables in the assessment of criticality.

Further information in addition to an individual acceleration value may be contained in the acceleration requested by the ACC control. The acceleration requested by the ACC control may accordingly be a state vector. For example, the state vector may contain system information concerning the host motor vehicle and/or the other motor vehicle. This includes vehicle-internal sensor information such as an engine speed, a wheel speed, a yaw rate, a steering angle, and a maximum achievable acceleration of the motor vehicle in question. In some cases this information concerning the other motor vehicle may be determined by the control system of the host motor vehicle, based on the image evaluation by the front camera sensor.

In a driving situation, in addition to current information the state vector may also contain appropriate information that has been measured and stored in one or more preceding steps. This information from the preceding step(s) may be incorporated into the state vector after appropriate filtering or without filtering. Similarly, the state vector may also contain appropriate information corresponding to chronologically pending (i.e., future) steps. This information is estimated by the control system, based on the current information and/or the information from the preceding steps, by prediction. This may be carried out, for example, by extrapolating the current information and/or information from the preceding steps.

In certain situations, taking into account the state vector for the requested acceleration by the ACC control, as an input variable in addition to the longitudinal distance and the time gap, may not be sufficient to satisfy the dynamics of the driving situation. This may be the case in particular when the longitudinal distance is comparatively small, for example in the range of 0.5 to 5 meters or in the range of 1 to 10 meters, and/or when the time gap is comparatively short, for example in the range of 0.2 to 1 second or in the range of 0.5 to 2 seconds. In such cases, the individual variables combined in the state vector for the acceleration request by the ACC control may be directly taken into account (with or without filtering) for the assessment of criticality.

As is apparent with reference to FIG. 5, after the normalization and/or weighting of the input variables for assessing the criticality, these variables are added. The criticality number is generated in this way. The addition allows individual critical input variables to be compensated for to a certain degree, if necessary, when one or more of the other input variables lie in the noncritical region. For example, even if a distance, which is critical because it is small, between the host motor vehicle and the other motor vehicle is present and the ACC control requests an acceleration for the host motor vehicle, the overall criticality and thus the generated criticality number may remain low, for example below a specified threshold (this threshold may be the limit value), when the other motor vehicle also requests an acceleration. In contrast, if the other motor vehicle slows down, in the overall consideration this may result in a criticality number that remains above the specified limit value or reaches it.

The control system of the host motor vehicle is also configured and intended for determining an error history for the other motor vehicle. For this purpose, an identifier (ID) is associated with the other motor vehicle. The number of recognized jumps (i.e., obvious errors in evaluating the distance from the other motor vehicle) is stored while the host motor vehicle is moving behind the other motor vehicle, for example within the scope of following travel. The control system determines and stores the following information for each recognized jump: the distance between the motor vehicles for which the jump has been recognized (for this purpose, for example the minimum distances before and after the jump are determined); the time gap between the motor vehicles at the time of the jump; an acceleration request by the ACC control at the time of the jump; and with regard to the relevant jump, whether or not the ACC control should be deactivated, and/or whether or not a warning should be output to the driver of the host motor vehicle.

Thus, the error history is more meaningful the longer the duration of the following travel behind the other motor vehicle. Depending on the duration of the incorporated error history and/or based on the number of recognized errors, a further positive or negative summand may be added for the addition of the normalized input variables for assessing the criticality. Whether the summand is positive or negative may depend on whether a most recently recognized jump is favorable or unfavorable for the ACC control. For example, if a large difference Diff has been recognized during the most recently recognized jump, and the instantaneously determined distance $A_T$ is significantly greater than the distance $A_{T-1}$ determined in the previous step, the summand may be positive in order to compensate for the potential incorrect information concerning the excessively large distance, by increasing the criticality number.

When the criticality number, which due to the normalization carried out ranges between −1 (critical) and 1 (noncritical), has been determined by the control system, it is digitized by comparing it to the number 0. The digitized criticality number is then available to the control system and other vehicle-internal systems of the host motor vehicle. The notation for the criticality number, using −1 (critical) to 1 (critical [sic; noncritical]), is to be understood strictly as an example. Of course, the control system may alternatively operate with the opposite algebraic sign, i.e., in a range of the criticality number from −1 (noncritical) to 1 (critical). Thus, when an increase in the criticality number is referred to within the scope of the present disclosure, this is understood to mean the change in the criticality number toward a more critical value, depending on the algebraic sign notation.

Although the control system may carry out the computations for the criticality number continuously in order to optimally adapt it to the dynamics of the current driving situation, it is conceivable to use the result only in conjunction with a specific error event. In other words, the control system is configured and intended for linking a specific result of the computation of the criticality number to an error event, such as a recognized jump between two determined distance signals. Thus, in the specific driving situation, for example in response to the detection of a jump, i.e., when a relevant difference in length $\text{Diff}_{rel}$ is present (see the third function block from the top in FIG. 3), a further check is made, based on the criticality number, as to whether the ACC control should be switched off by the control system and/or whether a warning, i.e., an alarm, should be output to the driver of the host motor vehicle in order to notify the driver that the current driving situation may possibly no longer be controllable by the ACC control. The alarm may output to the driver in particular when the criticality number reaches a set limit value in the current driving situation. Within the scope of the present disclosure, this is also the case, for example, when the criticality number deviates insignificantly, for example by up to ±0.1 or by up to ±0.15 or by up to ±0.2, from the limit value.

Regardless of the generation of the criticality number, the number of recognized jumps for the other motor vehicle may also result in deactivation of the ACC control. It is thus conceivable, for example, for the ACC control to be deactivated when a certain number of jumps, i.e., changes in the distance between the host motor vehicle and the other motor vehicle, occur within a comparatively short time, i.e., with a high frequency, for example in every, or every second, or every third measuring step. Thus, for example, 2, 3, or 4 successive jumps within a short time may result in deactivation of the ACC control.

These jumps may also be divided into critical jumps and noncritical jumps based on the criticality number, which the control system associates with a certain error event, for example a jump in the distance signal between two measuring points. In the case of recognition of a noncritical jump and a subsequent deceleration to a standstill by the host motor vehicle (for example, within the scope of follow-to-stop following travel behind the preceding motor vehicle, prompted by the ACC control), the control system may, for example, bring about at least partial deactivation of the ACC control. In such cases, the deactivation refers only to the specific other motor vehicle, i.e., within the scope of the following travel taking place at that moment. If a new ID is associated with the other motor vehicle at a later time, for example because the host motor vehicle has made a lane change and is subsequently following another motor vehicle having a different ID, a new deactivation of the ACC control must take place.

However, the control system is also configured and intended for canceling the deactivation of the ACC control in certain cases (even if the ID of the other motor vehicle remains the same, and within the scope of follow-to-stop following travel). In other words, the control system may ensure that the deactivated ACC control is reactivated. This restoration or reactivation of the ACC control by the control system is linked to certain conditions. One of these conditions may be reaching a minimum speed, i.e., reaching a certain limiting speed of the other motor vehicle. Another condition may be reaching a certain distance between the host motor vehicle and the other motor vehicle. These conditions may be used by the control system, singly or suitably combined with one another and with other conditions.

Reactivating the ACC control may be meaningful in particular in situations in which the host motor vehicle is traveling behind another motor vehicle with an ID that remains the same over an extended period of time, for example for several minutes, for example due to congested traffic, and the ACC control for this other motor vehicle has been deactivated once. The ACC control is therefore potentially available again more quickly due to the option for reactivation. The recognition of jumps and the recent deactivation of the ACC control are not affected by the reactivation of the ACC control. In addition to the procedure discussed above, in computing the distance $A_{ACC}$ to be used by the ACC control (see the fourth function block from the top in FIG. 3) it is optionally possible to use object recognition or an associated object classification of objects situated in the detection range of the front camera sensor of the host motor vehicle.

For this purpose, the control system of the host motor vehicle is configured and intended, based on the image data provided by the front camera sensor, for discerning the type of object the preceding motor vehicle, for example, involves, and classifying the object in an appropriate class. Since the preceding motor vehicle may be a truck, a passenger vehicle, a van, or a motorcycle, in each case optionally with a trailer having a different shape and/or size, incorporating the object classification into the computation of the distance to be used results in even more reliable and comfortable longitudinal control of the speed of the host motor vehicle.

For this purpose, the image data delivered by the front camera sensor concerning the preceding motor vehicle are analyzed by the control system and compared to a stored object database, for example. The analysis of the image data may take place based on histograms, for example. In addition, filters such as convolution filters may be used to prepare the image data. The objects are then classified, i.e., assigned to one of the classes "truck" or "passenger vehicle." It is also conceivable for further classes to exist, for example motorcycles and/or trucks and/or passenger vehicles, each with and without a trailer.

If the other motor vehicle preceding the host motor vehicle is classified in the truck object class, the computation of the distance $A_{ACC}$ to be used, in addition to the computation method explained above, may take place in the ways described below.

In one variant for determining the distance $A_{ACC}$ to be used by the ACC control for the truck object class, the control system initially reduces the instantaneously determined distance $A_t$ by a predetermined amount (also referred to below as an offset amount). This reduction in the instantaneously determined distance $A_t$ may be, for example, two meters, one meter, one-half meter, or any value in between. The determined distance $A_t$ that is reduced by the offset amount is then decreased by the relevant difference in length $Diff_{rel}$ if the first distance $A_1$ is greater than the second distance $A_2$. The determined distance $A_t$ that is reduced by the offset amount remains unchanged if the first distance $A_1$ is less than or equal to the second distance.

The offset amount may be variable in order to be set to 0 by the control system if the acceleration request and/or other functions of the ACC control are/is deactivated. The offset amount may also be linked to further parameters in order to be deactivated by the control system, for example because the object class of the other motor vehicle changes. The offset amount may be reset to its original value by the control system when the functions of the ACC control are reactivated. The offset amount may be stored for a certain object and used over the entire working range of the ACC control. The latter relates to (pre)settings, changeable in particular by the driver of the host motor vehicle, concerning time gaps to be maintained with respect to the other motor vehicle and for all distances to be maintained from the other motor vehicle.

This computation variant for determining the distance $A_{ACC}$ to be used by the ACC control may optionally be linked to the condition that the other motor vehicle has been recognized as a new object by the control system of the host motor vehicle, and this object is a truck. In contrast, if only the object class of an already recognized object changes, for example from a passenger vehicle to a truck, (an ID assigned to the object remains unchanged), the offset amount is not included in the computation of $A_{ACC}$ in order to prevent the generation of artificial distance jumps from the viewpoint of the control system.

In another variant for determining the distance $A_{ACC}$ to be used by the ACC control, which may but does not have to depend on the object classification, the distance (also referred below as the rest distance) that the host motor must or at least should maintain after stopping behind the other motor vehicle is increased internally by the control system from 3 meters to 4 meters, for example, for a predefined time gap of one second. In other words, within the scope of follow-to-stop travel and for a time gap of one second that is to be maintained with respect to the other motor vehicle, the host motor vehicle should come to a stop 4 meters behind the other motor vehicle as soon as the other motor vehicle has also decelerated to a standstill.

In another configuration, 4 meters may, for example, be the value of the rest distance for a time gap of 1.5 seconds. There are even further configurations of the combination of the time gap and the rest distance between the motor vehicles, which may be settable by the driver of the host motor vehicle and which the control system may access via a memory in order to determine the distance $A_{ACC}$ to be used by the ACC control.

In yet another variant for determining the distance $A_{ACC}$ to be used by the ACC control, which may but does not have to depend on the object classification, a temporal component is additionally taken into account. This temporal component indicates how long the distance to be used by the ACC control, once determined, retains its validity. After a predetermined time period has elapsed, the instantaneously determined distance $A_T$ may then be employed by the control system as the distance $A_{ACC}$ to be used.

For this purpose and in such cases, the control system includes at least one timer or is connected to a timer via a suitable data channel. The control system is configured and intended for starting the timer, setting it to a certain starting value, and once again stopping or switching it off. By means of this timer the control system sets a time window for which the determined distance $A_{ACC}$ to be used retains its validity. This time window may be, for example, 0.75 second or 1.0 second or 1.25 seconds or 1.5 seconds or 2.0 seconds or 2.5 seconds long. The duration of the time window may also assume any value between these values. For this purpose, the control system sets the timer to an appropriate starting value.

If the other motor vehicle is not a truck, i.e., the object classification assigned to the other motor vehicle is a class different from the truck class, when the timer is set to an appropriate starting value the control system decides, for example two seconds after the control system has determined the distance $A_{ACC}$ to be used for the ACC control (see the description for FIGS. 3 and 4 for the general determination), to employ the most current determined distance value $A_T$ as the distance $A_{ACC}$ to be used for the ACC control.

For this purpose, the control system may start the timer, for example at the time that the distance $A_{ACC}$ to be used is determined. When the control system recognizes the expiration of the timer, the control system changes the distance to be used to the distance $A_T$. This may be linked to the additional condition that the control system has not recognized a jump in the distance signal within the timer run time or at least a portion of this run time, for example within the last second.

In this way, the distance between the host motor vehicle and the other motor vehicle during follow-to-stop travel does not become unnecessarily great.

Within the scope of the variants described above, the control system in each case is configured and intended for outputting the distance $A_{ACC}$, to be used by the ACC control of the host motor vehicle, to the ACC control when the measure of the criticality deviates from the limit value. Similarly, the control system is configured for carrying out appropriate operations if the measure of criticality significantly undershoots or overshoots the limit value. This includes switching off the ACC control (also see FIG. 3). This switching off may be understood to mean completely turning off the ACC control. However, it is also conceivable for the switching off (or deactivating or disabling) of the ACC control to include only switching off certain functions such as an acceleration request, while braking interventions, but also in particular warnings to the driver of the host motor vehicle, are still possible. Lastly, switching off the ACC control may also mean that all interventions in the engine management and/or braking management of the host motor vehicle are deactivated, but warnings for the driver of the host motor vehicle may still be made by the ACC control. Several examples are described below in which no general deactivation of the ACC control is carried out by the control system, even when jumps are recognized in conjunction with a high measure of criticality, i.e., critical jumps.

When the other motor vehicle, behind which the host motor vehicle is carrying out following travel, is a long vehicle alter with a trailer anh (see FIG. 3) and the control system has recognized a critical jump in the distance signal, the control system can maintain all functions of the ACC control. Optionally, the control system may deactivate at least an acceleration request by the ACC control.

The condition that the control system recognizes the jump as critical may depend, for example, on the presence of a significantly small time gap between the host motor vehicle and the preceding motor vehicle, and a simultaneous deceleration by the other motor vehicle. In this example, the control system additionally outputs a warning to the driver of the host motor vehicle to indicate that the ACC control may possibly not be able to decelerate the host motor vehicle in a timely manner, i.e., at least early enough to prevent a rear-end collision with the other motor vehicle. This warning is thus a warning (system limit warning (SLW)) that the system limits of the control system have (possibly) been reached. Due to the uncertainty resulting from the critical jump, from the viewpoint of the control system the driver of the host motor vehicle must thus be ready for a braking intervention until the host motor vehicle comes to a standstill behind the other motor vehicle. The warning is maintained for this period of time. The additional use of the ACC control provides extra assistance to the driver, even if a deceleration to a standstill is no longer possible via the ACC control alone.

In another example, the control system may follow a similar procedure when the measure of the criticality moves into the range of the limit value, i.e., coincides with same or just barely, i.e., insignificantly, overshoots or undershoots it. In such cases, the control system may incorporate a further condition that there is a comparatively small time gap between the host motor vehicle and the other motor vehicle. Alternatively or additionally, in such cases the control system may incorporate a further condition that there is a comparatively small time gap between the host motor vehicle and the other motor vehicle, and at the same time the other motor vehicle is decelerating.

Thus, if the control system has recognized a critical jump in the distance signal, the control system can maintain all functions of the ACC control. Optionally, the control system may deactivate at least one acceleration request by the ACC control. The control system in turn additionally outputs a warning to the driver of the host motor vehicle to indicate to the driver that the ACC control may possibly not be able to decelerate the host motor vehicle in a timely manner, i.e., at least early enough to prevent a rear-end collision with the other motor vehicle, or early enough that the desired rest distance of 3 m to 4 m, for example, can no longer be achieved. Here as well, an SLW warning is made which may, for example, also be linked to a notification that a potentially critical situation may occur if the other motor vehicle decelerates.

In both of the examples described above, maintaining the ACC control or merely partially deactivating the ACC control, more precisely, its acceleration request, results in the desired distance between the host motor vehicle and the other motor vehicle being more reliably maintained in the event that the other motor vehicle decelerates to a standstill. Even if the ACC control is not able to establish the desired rest distance between the two motor vehicles, deceleration may still take place until the driver takes control of the braking system of the host motor vehicle. Overall, better availability of the ACC control is provided over the entire travel course.

Figure 2:
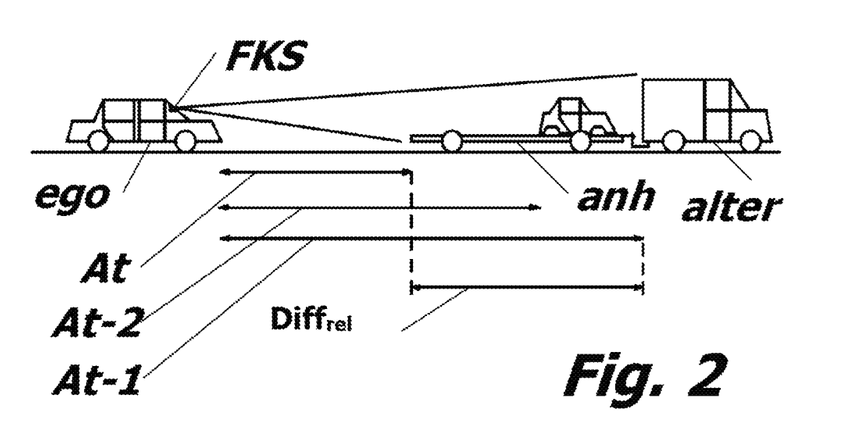
FIG. 2 schematically shows a host motor vehicle in which at least one other vehicle with a flat-bed trailer is detected in an area in front of the host motor vehicle by means of a mono front camera with a downstream image evaluation unit and ACC system.

In yet another example, if a jump in the distance signal is recognized, the control system may leave the ACC control active, optionally without the option for an acceleration request by the ACC control, and also output a warning to the driver of the host motor vehicle when the jump has resulted in the last determined distance $A_t$ being recognized as incorrect. This may be the case, for example, when the front camera sensor of the host motor vehicle initially determines the distance $A_{t-1}$ between the host motor vehicle and the other motor vehicle alter (see FIG. 2), and in a next (most current) determination step determines the distance $A_t$ between the host motor vehicle and the trailer anh of the other motor vehicle.

All of the examples described above share the common feature that the warning that is output to the driver of the host motor vehicle may assume various intensity levels, for example by displaying the warning on a display unit of the host motor vehicle in different colors such as yellow (for a lower intensity) and red (for a higher intensity). In addition to the warning to the driver or also independently thereof, the control system is also able in each case to transmit a signal to an automatic emergency braking assistant of the host motor vehicle, which in the event of a risk of a rear-end collision of the host motor vehicle with the other motor vehicle prevents a collision between the two motor vehicles via suitable interventions in the engine management and/or braking management of the host motor vehicle.

Figure 6:
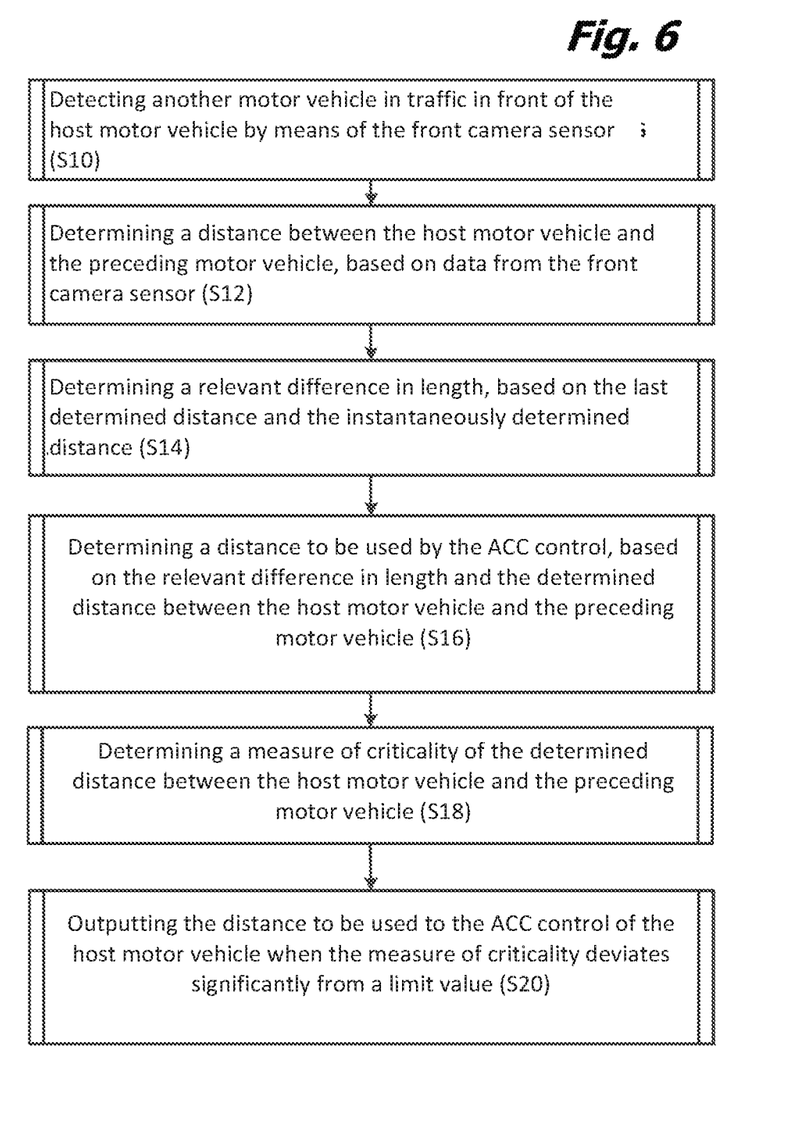
FIG. 6 shows a flow chart for a control method according to certain exemplary embodiments.

FIG. 6 shows a flow chart for a control method which in a host motor vehicle (ego) recognizes a preceding motor vehicle (alter) and preferably preceding objects, based on surroundings data obtained from at least one front camera sensor (FKS) associated with the host motor vehicle (ego). The control method may be carried out by the above-described control system, for example. All features described within the scope of the control system may also be used for the control method. In particular, all of the features described above with regard to the assessment of criticality, the at least partial deactivation of the ACC control, the reactivation thereof, and the determination of the distance $A_{ACC}$ to be used by the ACC control are transferable to the control method.

Another motor vehicle (alter) in traffic in front of the host motor vehicle (ego) is detected in a first step S10 by means of the at least one front camera sensor. A distance between the host motor vehicle (ego) and the preceding motor vehicle (alter) is determined in a second step S12, based on data from the front camera sensor (FKS). A relevant difference in length ($\text{Diff}_{rel}$) is determined in a third step S14, based on the last determined distance ($A_{t-1}$) and the instantaneously determined distance ($A_t$). A distance ($A_{ACC}$) to be used by the ACC control is determined in a fourth step S16, based on the relevant difference in length ($\text{Diff}_{rel}$) and the instantaneously determined distance ($A_t$). A measure of the criticality of the determined distance between the host motor vehicle (ego) and the preceding motor vehicle (alter) is determined in a fifth step S18. Lastly, the distance ($A_{ACC}$) to be used is output to the ACC control of the host motor vehicle (ego) in a fifth [sic; sixth] step when the measure of the criticality deviates significantly from a limit value.

The above-described variants and their design and operational aspects are used solely for a better understanding of the structure, the operating principle, and the properties; they do not limit the disclosure to the exemplary embodiments, for example. The figures are schematic in some cases, with important properties and effects sometimes illustrated with great enlargement in order to explain the functions, operating principles, technical embodiments, and features. In this regard, any operating principle, any principle, any technical embodiment, and any feature disclosed in the figures or in the text may be freely and arbitrarily combined with all claims, any feature in the text and in the other figures, other operating principles, principles, technical embodiments, and features that are contained in the present disclosure or result therefrom, so that all conceivable combinations may be associated with the described procedure. Also encompassed are combinations between all individual statements in the text, i.e., in any section of the description, in the claims, and also combinations between various variants in the text, in the claims, and in the figures. Furthermore, the claims do not limit the disclosure, or thus, the options for combining all of the described features with one another. Moreover, all of the stated features are explicitly disclosed herein, individually and in combination with all other features.

The invention claimed is:

1. A control system having an ACC control, which for use in a host motor vehicle (ego) is configured and intended for recognizing a preceding motor vehicle (alter) and preferably preceding objects, based on surroundings data obtained from at least one front camera sensor associated with the host motor vehicle (ego), wherein the at least one front camera sensor (FKS) is configured for providing to an electronic control unit of the control system the surroundings data that represent an area in front of the host motor vehicle (ego), and wherein the control system is at least configured and intended for
    detecting another motor vehicle (alter) in traffic that is in front of the host motor vehicle (ego), by means of the at least one front camera sensor (FKS);
    determining a distance between the host motor vehicle (ego) and the preceding motor vehicle (alter), based on data from the front camera sensor (FKS);
    determining a relevant difference in length ($\text{Diff}_{rel}$), based on the last determined distance ($A_{t-1}$) between the host motor vehicle (ego) and the preceding motor vehicle (alter) and an instantaneously determined distance ($A_t$) between the host motor vehicle (ego) and the preceding motor vehicle (alter);
    determining a distance ($A_{ACC}$) to be used by the ACC control, based on the relevant difference in length ($\text{Diff}_{rel}$) and the instantaneously determined distance ($A_t$);
    determining a measure of the reliability of the determined distance between the host motor vehicle (ego) and the preceding motor vehicle (alter), and
    outputting the distance ($A_{ACC}$) to be used to the ACC control of the host vehicle (ego) when the measure of the reliability deviates significantly from a limit value.

2. The control system according to claim 1, which is configured and intended for outputting to the ACC control the distance ($A_{ACC}$) to be used, in the form of a recommendation for a driver of the host motor vehicle (ego) or (semi)autonomously, as a function of the distance ($A_{ACC}$) to be used, in order to influence a distance from the preceding motor vehicle (alter) via a braking system or an engine management system of the host motor vehicle (ego).

3. The control system according to claim 1, which is configured and intended for determining the relevant difference in length ($\text{Diff}_{rel}$) based on the last determined distance ($A_{t-1}$) and the instantaneously determined distance ($A_t$) by
    determining a difference (Diff) based on the last determined distance ($A_{t-1}$) between the host motor vehicle (ego) and the preceding motor vehicle (alter) and the instantaneously determined distance ($A_t$) between the host motor vehicle (ego) and the preceding motor vehicle (alter); and/or
    determining whether this difference (Diff) is positive or negative; and/or
    comparing this difference (Diff) to a threshold (Schw) that has a presettable minimum (Mini) and a presettable slope (Steig) and that is a function of the instantaneously determined distance ($A_t$); and
    categorizing this difference (Diff) as the relevant difference in length ($\text{Diff}_{rel}$) if this difference (Diff) is above the threshold (Schw).

4. The control system according to claim 1, which is configured and intended for storing for a future evaluation
    the relevant difference in length ($\text{Diff}_{rel}$),
    the instantaneously determined distance ($A_t$), and/or
    the distance ($A_{ACC}$) to be used by the ACC control.

5. The control system according to claim 1, which is configured and intended for determining the distance ($A_{ACC}$) to be used by the ACC control, based on the relevant difference in length ($\text{Diff}_{rel}$) and the instantaneously determined distance ($A_t$), by
    examining a sequence between the host motor vehicle (ego) and the preceding motor vehicle (alter) of the next-to-last determined distance ($A_{t-2}$), the last determined distance ($A_{t-1}$), and the instantaneously determined distance ($A_t$), by
    using a first distance ($A_1$) based on the next-to-last determined distance ($A_{t-2}$) and the last determined distance ($A_{t-1}$), and a second distance ($A_2$) based on the last determined distance ($A_{t-1}$) and the instantaneously determined distance ($A_t$), and
    for determining the distance ($A_{ACC}$) to be used by the ACC control, the instantaneously determined distance ($A_t$)
    is reduced by the relevant difference in length ($\text{Diff}_{rel}$) if the first distance ($A_1$) is greater than the second distance ($A_2$);
    remains unchanged if the first distance ($A_1$) is less than or equal to the second distance ($A_2$).

6. The control system according to claim 1, which for determining the measure of the reliability of the determined distance between the host motor vehicle and the preceding motor vehicle is configured and intended for:
    determining a longitudinal distance between the host motor vehicle and the preceding motor vehicle;

determining a time gap between the host motor vehicle and the preceding motor vehicle, based on the longitudinal distance between the host motor vehicle and the preceding motor vehicle;

generating a criticality number that denotes the measure of the reliability, based on the longitudinal distance, the time gap, and/or an acceleration request by the ACC control; and in the case that the measure of reliability does not deviate from the limit value, deactivating the ACC control, at least in part.

7. The control system according to claim 6, which is further configured and intended for normalizing the longitudinal distance, the time gap, and/or the acceleration request, computing the criticality number by adding the normalized longitudinal distance, the normalized time gap, and/or the normalized acceleration request, and/or reactivating the ACC control when a predetermined condition is satisfied.

8. The control system according to claim 1, which is further configured and intended for classifying the other motor vehicle in an object class, based on the data of the front camera sensor, and if the other motor vehicle is classified in an object class that is different from the passenger vehicle object class, reducing the next-to-last determined distance ($A_{t-2}$) and/or the last determined distance ($A_{t-1}$) and/or the instantaneously determined distance ($A_t$) by a predetermined distance.

9. The control system according to claim 1, which is further configured and intended for classifying the other motor vehicle in an object class, based on the data of the front camera sensor, starting a timer with a predetermined time period if the other motor vehicle is classified in an object class that is different from the truck object class, upon output of the distance ($A_{ACC}$) to be used, recognizing an expiration of the timer after the predetermined time period has elapsed, and upon recognition of the expiration of the timer, outputting to the ACC control of the host vehicle the instantaneously determined distance $A_T$ as the distance to be used by the ACC control.

10. A control method, which in a host motor vehicle (ego) recognizes a preceding motor vehicle (alter) and preferably preceding objects, based on surroundings data that represent an area in front of the host motor vehicle (ego) and are obtained from at least one front camera sensor (FKS) associated with the host motor vehicle (ego), wherein the control method comprises:

detecting another motor vehicle (alter) in traffic in front of the host motor vehicle (ego) by means of the at least one front camera sensor (FKS);

determining a distance between the host motor vehicle (ego) and the preceding motor vehicle (alter), based on data from the front camera sensor (FKS);

determining a relevant difference in length ($\text{Diff}_{rel}$), based on the last determined distance ($A_{t-1}$) between the host motor vehicle (ego) and the preceding motor vehicle (alter) and an instantaneously determined distance ($A_t$) between the host motor vehicle (ego) and the preceding motor vehicle (alter);

determining a distance ($A_{ACC}$) to be used by the ACC control, based on the relevant difference in length ($\text{Diff}_{rel}$) and the instantaneously determined distance ($A_t$);

determining a measure of the reliability of the determined distance between the host motor vehicle (ego) and the preceding motor vehicle (alter); and outputting the distance ($A_{ACC}$) to be used to the ACC control of the host motor vehicle (ego) when the measure of the reliability deviates significantly from a limit value.

* * * * *